United States Patent
Dausend

(10) Patent No.: US 9,317,024 B2
(45) Date of Patent: Apr. 19, 2016

(54) AUTOMATION SYSTEM

(71) Applicant: Stefan Dausend, Schwabach (DE)

(72) Inventor: Stefan Dausend, Schwabach (DE)

(73) Assignee: Siemens Aktiengesellschaft, Munich (DE)

( * ) Notice: Subject to any disclaimer, the term of this patent is extended or adjusted under 35 U.S.C. 154(b) by 395 days.

(21) Appl. No.: 13/921,775

(22) Filed: Jun. 19, 2013

(65) Prior Publication Data

US 2014/0005803 A1 Jan. 2, 2014

(30) Foreign Application Priority Data

Jul. 2, 2012 (EP) .................................. 12174585

(51) Int. Cl.
*G05B 15/02* (2006.01)
*G05B 19/042* (2006.01)

(52) U.S. Cl.
CPC ............ *G05B 15/02* (2013.01); *G05B 19/0423* (2013.01); *G05B 2219/25021* (2013.01)

(58) Field of Classification Search
None
See application file for complete search history.

(56) References Cited

U.S. PATENT DOCUMENTS

2007/0226317 A1* 9/2007 Rydberg .................. H04L 69/08
709/218
2012/0283847 A1* 11/2012 Prieler ............... G05B 19/0423
700/29

OTHER PUBLICATIONS

Mirko Funke: "PROFINET Innovations 2010", Dec. 31, 2010, pp. 1-8, XP002688117, Nuremberg, Germany Found on the internet: URL:http://www.automation.siemens.com/mcms/automation/en/industrial-communications/profinet/Documents/articles/_assets/innovation/PROFINET_Innovations_EN_F1.pdf [found on Nov. 27, 2012], pp. 2-3; DE; Dec. 31, 2010.
Anonym: "PROFINET Systembeschreibung Technologie und Anwendung", PROFIBUS Nutzerorganisation 30. Jun. 30, 2011, pp. 1-24, XP002688116, Found on the internet: URL:http:/www.profibus.com/nc/downloads/downloads/profinet-technology-and-application-system-description/display/ [found on Nov. 27, 2012] p. 11; Jun. 30, 2011.

* cited by examiner

*Primary Examiner* — Sean Shechtman
*Assistant Examiner* — Steven Garland
(74) *Attorney, Agent, or Firm* — Cozen O'Connor

(57) ABSTRACT

An automation system includes a first controller and a second controller connected to an input device via a field bus, wherein the input device includes a module having at least one first sub-module and one second sub-module, the first controller includes first interconnection information that defines an assignment between the first controller and the first sub-module, and the second controller includes second interconnection information that defines an assignment between the second controller and the second sub-module, wherein the module is additionally configured to be connected to a plurality of inputs for process signals, wherein a process signal image is stored in a first memory area assigned to the first sub-module, and wherein the module additionally includes a copying device which is configured to copy the process signal image from the first memory area to a second memory area assigned to the second sub-module.

6 Claims, 2 Drawing Sheets

AUTOMATION SYSTEM

BACKGROUND OF THE INVENTION

1. Field of the Invention

The invention relates to an automation system comprising a first controller and a second controller which are connected to an input device via a field bus, where the input device is particularly configured to operate, for example, in an automation system having a field bus compliant with the Profinet IO standard.

2. Description of the Related Art

In general, automation systems having input devices are generally known, and are preferably used in process and production automation to receive data and forward it to relevant controllers, such as automation devices of the programmable logic controller type, at distributed locations in the process to be automated.

In distributed automation environments, a status and a signal image of the process signals of the input devices are frequently required for different controllers.

To distribute the process signal image to a first controller and to another second controller, the solution has hitherto been for the data from the input device or peripheral to be read by the first controller and then preferably transmitted or forwarded via a separate data line to the second controller which likewise requires these process signals for performing its specific control tasks. The disadvantage of this procedure is that the data, i.e., the process signals, reaches the second controller with a delay compared to the arrival time at the first controller. This forwarding must also be configured, i.e., programmed, which involves higher cost/complexity. Also, diagnostic information would likewise have to be communicated to possible other controllers via this additional data path. Data consistency between the different controllers is not therefore guaranteed.

SUMMARY OF THE INVENTION

It is therefore an object of the present invention to provide an automation system having at least one first controller and one second controller, where it is possible to forward process signals of an input device virtually simultaneously to both controllers.

This and other objects and advantages are achieved in accordance with the invention by an automation system comprising a first controller and a second controller which are connected to an input device via a field bus, where the input device comprises a module which in turn has at least one first sub-module and one second sub-module, where the first controller has first interconnection information defining an assignment between the first controller and the first sub-module, and the second controller has second interconnection information defining an assignment between the second controller and the second sub-module, where the module is also configured to be connected to a plurality of inputs for process signals, where a process signal image is stored in a first memory area, and where the first memory area is assigned to the first sub-module, the module also having a copying device that is configured to copy the process signal image from the first memory area to a second memory area, the second memory area being assigned to the second sub-module.

If, for example, two controllers are connected to an input device, these are referred to in automation terms, particularly in the case of Profinet I/O, as shared devices. The input device is therefore a shared input device that can provide data for various controllers. For modeling in accordance with the Profinet standard (International Electrotechnical Commission (IEC) 61585/IEC 61784) it is provided that shared devices are assembled by subdividing the input device into sub-modules and uniquely assigning the sub-modules to a controller. A software application of the controller can only interrogate or control the assigned sub-modules. As the manufacturers do not want to contravene this standard when designing automation equipment and input devices, yet wish to make it possible for a plurality of controllers to access particular process signal images simultaneously, a copying device and a plurality of assigned memory areas have been advantageously incorporated in the input device, so that the process signals can be provided simultaneously to the different controllers.

In an advantageous embodiment, the module has an operating mode switching device that is connected to a means comprising module control software, said control software being designed to interrogate the operating mode switching device and select between module control in standard mode or in copying mode. The advantage of the operating mode switching device is that an input device can be flexibly deployed in an automation system.

In order to simplify the assignments between the controllers and the sub-modules, the module has a parameter block in which is stored a device model comprising the input device, at least the first module which in turn comprises at least the sub-module, and the first and the second controller with their interconnection information. The modeling of the device model is used, for example, in the above mentioned Profinet standard in which the device types controller and I/O device are specified, the I/O device corresponding to the input device. The device model for I/O devices consequently consists of the objects I/O device, modules and sub-modules. The Profinet specification provides that a sub-module with interfaces is uniquely assigned to a controller. Using the parameter block in the module, the input device is still parameterized in accordance with the Profinet specification with the unique assignment of a sub-module to a controller. However, the copying device now allows the process signal image to be copied to different memory areas, the memory areas being in turn uniquely assigned to the sub-modules.

In another embodiment of the automation system, the module has a diagnostic device for the process signals and the diagnostic device is configured to evaluate the signal state of a process signal and to assign the process signal a status and store it in the first memory area. This diagnostic information is provided in the memory areas for the controllers as supplementary information in addition to the signal states of the process signals. To make this possible, the copying device is additionally configured to copy the status of the process signals from the first memory area to the second memory area.

In another advantageous embodiment, the input device has a backplane bus into which the plurality of modules can be inserted.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment is illustrated in the accompanying drawings, in which.

DETAILED DESCRIPTION OF THE PREFERRED EMBODIMENTS

Figure 1:
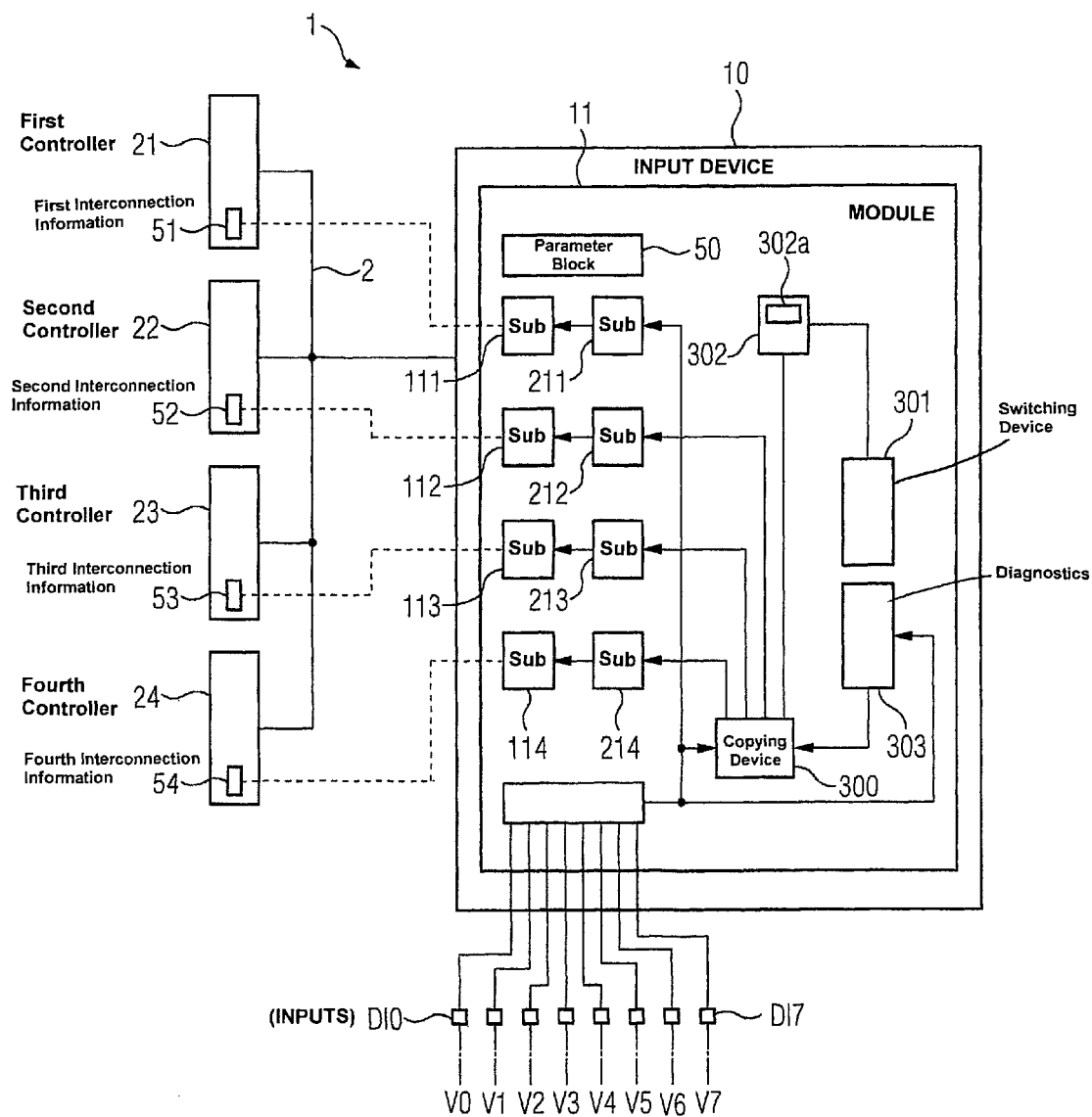
FIG. 1 shows an automation system having a plurality of controllers and an input device in accordance with the invention.

FIG. 1 shows an automation system 1 comprising a first controller 21, a second controller 22, a third controller 23 and a fourth controller 24 which can collectively access an input device 10 via a field bus 2.

In order to coordinate the accesses, the first controller 21 has first interconnection information 51, where the access of the first controller 21, via the field bus 2, to a first sub-module 111 of a module 11 of the input device 10 is represented by a dashed line.

The second, third, fourth controllers 22,23,24 likewise have second, third, fourth interconnection information 52,53, 54. These access paths are also represented by dashed lines to the input device 10. The first controller 21 is accordingly assigned to the first sub-module 111, the second controller 22 to a second sub-module 112, the third controller 23 to a third sub-module 113, and the fourth controller 24 to a fourth sub-module 114.

The input device 10 is connected to a plurality of inputs DI0, . . . , DI7 for process signals.

In this exemplary embodiment, the input device 10 has only one first module 11. Process signals from a process to be automated are connected via signal lines to the module 11 at inputs DI0, . . . , DI7. The signal lines lead to a means of providing a process signal image. A first memory area 211 is connected to the means of providing a signal image via corresponding data lines. The first memory area 211 is in turn connected to the first sub-module 111. The signal states of the process signals are therefore made available to the first sub-module 111 via the first memory area 211 and, via the assignment of the first controller 21 having the first interconnection information 51, the first controller 21 can access the process signals of the inputs DI0, . . . , DI7 via the first sub-module 111.

In order to also provide the process signals of the inputs DI0, . . . , DI7 to the second controller 22, the module 11 has a copying device 300 which is configured to copy the process signal image from the first memory area 211 to a second memory area 212, where the second memory area 212 is assigned to the second sub-module 112. A copy of the process signals of the inputs DI0, . . . , DI7 is now available in the second memory area 212, the second memory area 212 being assigned to the second sub-module 112. Via the second interconnection information 52 in the second controller 22, the second controller 22 can likewise access the process signals of the inputs DI0, . . . , DI7 virtually simultaneously with the first controller 21. Time-consuming copying of the process signals from the first controller 21 to the second controller 22 via a separate data line can therefore be advantageously eliminated.

Instead of copying over the process signals via a memory area, they can also be transmitted in parallel to the addresses assigned to the sub-modules 111,112,113,114.

In addition, the module 11 is configured such that a third memory area 213 is assigned to a third sub-module 113 and a fourth memory area 214 is assigned to a fourth sub-module 114. The copying device 300 is configured either to copy the process image of the process signals from the first memory area 211 to the respective second, third and fourth memory areas 212,213,214 in each case, or else the copying device 300 operates as a type of distributor and distributes copies automatically to the respective memory areas.

In order to change from standard operation to copying mode, the module 11 has an operating mode switching device 301 that is connected to a means 302 comprising control software 302a. The control software 302a is designed to interrogate the operating mode switching device 301 and to change between control of the module 11 in standard mode or copying mode.

Standard operation accordingly corresponds to the Profinet specification that a sub-module 111,112,113,114 is assigned to one controller 21,22,23,24 in each case. Copying mode now enables process signals to be provided simultaneously to all the connected controllers 21,22,23,24 via the inputs DI0, . . . , DI7.

Figure 2:
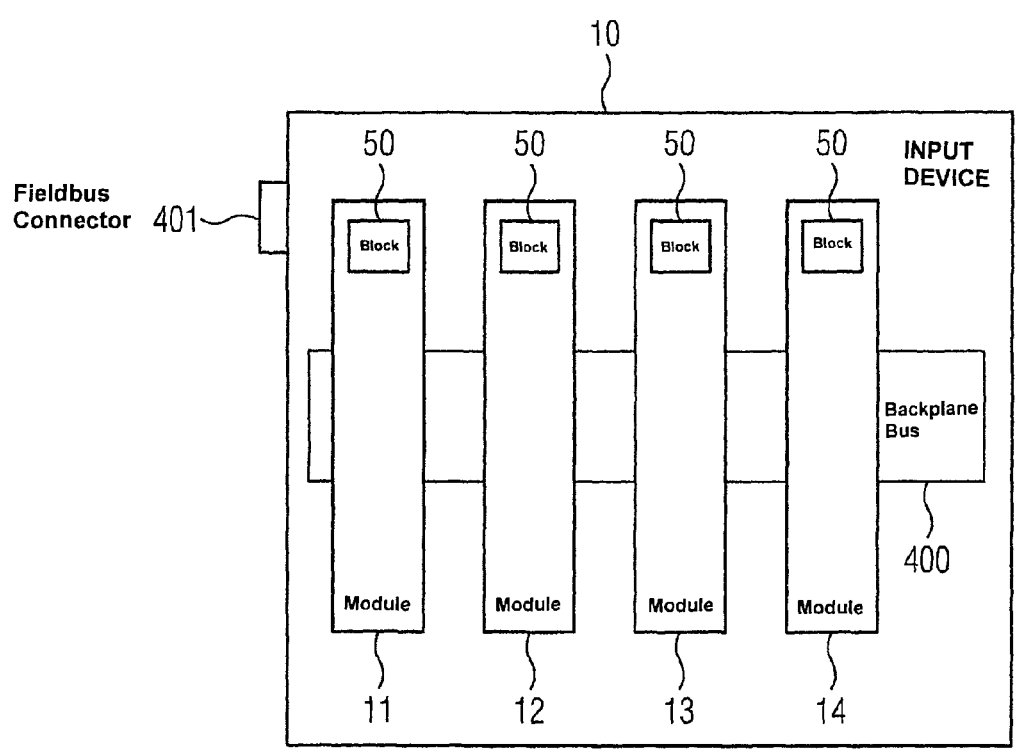
FIG. 2 shows an input device having a plurality of modules in accordance with the invention.

FIG. 2 shows an extended input device 10. The input device 10 is extended such that it can accommodate not only the first module 11 but also a second module 12, a third module 13 and a fourth module 14 via a built-in backplane bus 400. All the modules each have a parameter block 50 in which the interconnection information for the different controllers is stored. The internal configuration of the modules 11,12,13,14 corresponds to the configuration of the first module 11 shown in FIG. 1. The input device 10 has a field bus connection 401 to which the field bus 2 is connected.

Thus, while there have shown, described, and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An automation system comprising:
   a first controller;
   a second controller; and
   an output device connected to the first and second controllers via a field bus, the output device comprising a module having at least one first sub-module, a second sub-module, and an operating mode switching device connected to a means comprising control software of the module, the control software for interrogating the operating mode switching device and selecting between control of the module in one of a standard mode or a copying mode;
   wherein the first controller includes first interconnection information which defines an assignment between the first controller and the first sub-module;
   wherein the second controller includes second interconnection information which defines an assignment between the second controller and the second sub-module; and
   wherein the module is further configured to be connected to a plurality of inputs for process signals, a process signal image being stored in a first memory area assigned to the first sub-module, the module additionally including a copying device configured to copy the process signal image from the first memory area to a second memory area assigned to the second sub-module.

2. The automation system as claimed in claim 1, wherein the module includes a parameter block in which is stored a device model comprising an input device, at least the module including at least the first sub-module, and the first and second controller with their interconnection information.

3. The automation system as claimed in claim 2, wherein the device model is operated in accordance with a Profinet specification.

4. The automation system as claimed in claim 1, wherein the module includes a diagnostic device for the process signals, and the diagnostic device is configured to evaluate a signal state of a process signal and to assign the process signal a status and store the status in the first memory area.

5. The automation system as claimed in claim 4, wherein the copying device is further configured to copy the status of the process signals from the first memory area to the second memory area.

6. The automation system as claimed in claim 1, further comprising an input device including a backplane bus into which a plurality of modules is insertable.

\* \* \* \* \*